(12) United States Patent
Feldman (10) Patent No.: US 8,977,834 B2
(45) Date of Patent: Mar. 10, 2015

(54) DYNAMIC STORAGE REGIONS

(75) Inventor: Timothy Richard Feldman, Louisville, CO (US)

(73) Assignee: Seagate Technology LLC, Cupertino, CA (US)

( * ) Notice: Subject to any disclaimer, the term of this patent is extended or adjusted under 35 U.S.C. 154(b) by 608 days.

(21) Appl. No.: 13/026,535

(22) Filed: Feb. 14, 2011

(65) Prior Publication Data

US 2012/0210092 A1 Aug. 16, 2012

(51) Int. Cl.
*G06F 12/00* (2006.01)
*G11B 20/12* (2006.01)

(52) U.S. Cl.
CPC .... *G11B 20/1258* (2013.01); *G11B 2020/1277* (2013.01); *G11B 2220/2516* (2013.01)
USPC ................ 711/171; 711/209; 711/E12.002

(58) Field of Classification Search
CPC ................ G11B 20/1258; G11B 2020/1277; G06B 2220/2516
USPC ................................ 711/171, 209
See application file for complete search history.

(56) References Cited

U.S. PATENT DOCUMENTS

| 5,477,525 | A | * | 12/1995 | Okabe ................... 369/30.1 |
| 7,688,544 | B1 | | 3/2010 | Mallary et al. |
| 7,729,092 | B1 | | 6/2010 | Mallary et al. |
| 8,352,685 | B2 | * | 1/2013 | Bannon et al. ............ 711/135 |
| 2002/0071198 | A1 | * | 6/2002 | Liu et al. ................. 360/77.02 |
| 2006/0227449 | A1 | * | 10/2006 | Che et al. ................... 360/75 |
| 2007/0030588 | A1 | | 2/2007 | Tsuchinaga et al. |
| 2009/0147652 | A1 | * | 6/2009 | Fujita .......................... 369/100 |
| 2012/0176698 | A1 | * | 7/2012 | Rub ............................ 360/31 |

OTHER PUBLICATIONS

Ahmed Amer et al., "Design Issues for a Shingled Write Disk System," 978-1-4244-7153-9/10 IEEE, May 10, 2010, 12 pages, Appeared in 26th IEEE Symposium on Massive Storage Systems and Technologies: Research Track (MSST 2010).

* cited by examiner

*Primary Examiner* — Aracelis Ruiz
(74) *Attorney, Agent, or Firm* — HolzerIPLaw, PC (57) ABSTRACT

A method or system for determining storage location of an isolation region based on a data region sizing specified by a host device. In one implementation, the isolation region comprises a set of storage locations required for isolation of or more data region of the storage device.

20 Claims, 5 Drawing Sheets

DYNAMIC STORAGE REGIONS

SUMMARY

The described subject matter relates to a method or system for determining storage location of an isolation region based on a data region sizing specified by a host device. In one implementation, the isolation region comprises a set of storage locations required for isolation of or more data region of the storage device.

BRIEF DESCRIPTIONS OF THE DRAWINGS

A further understanding of the various implementations described herein may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTIONS

In the following description, for the purposes of explanation, numerous specific details are set forth in order to provide a thorough understanding of the various implementations described herein. While various features are ascribed to particular implementations, it should be appreciated that the features described with respect to one implementation may be incorporated with other implementations as well. By the same token, however, no single feature or features of any described implementation should be considered essential, as other implementations may omit such features.

Magnetic media storage drives store data in polarized cells on one or more magnetized media within each storage drive. A magnetic disc drive is one implementation of a magnetic media storage drive in which the magnetic medium is a disc and the polarized cells are arranged on the disc in concentric, generally circular tracks. In operation, one or more of the discs rotate at a constant high speed within the storage drive while information is written to and read from the tracks on the disc(s) using an actuator assembly. The actuator assembly rotates during a seek operation about a bearing shaft assembly positioned adjacent the discs.

The actuator assembly includes one or more plurality of actuator arms that extend towards the discs. Mounted at the distal end of each of the actuator arms is a head with a read pole and a write pole. The write pole generates a magnetic field adapted to change the magnetic polarization of the cells on a corresponding disc (i.e., it writes data to the disc) and the read pole detects the magnetic polarization of the cells on the corresponding disc (i.e., it reads data from the disc).

In a non-shingled magnetic medium, each of the cells on the magnetized medium are of a sufficiently large size relative to the size of the write pole to allow the write pole to write data to the cells without overwriting data in any surrounding cells. As a result, data may be randomly written to available cells anywhere on the magnetic medium. However, as requirements for data storage density increase for the magnetic media, cell size decreases. A commensurate decrease in the size of the write pole is difficult because a strong write field gradient provided by a larger write pole is often required to shift the polarity of the cells on the magnetized medium. As a result, writing data to smaller cells on the magnetized medium using the relatively larger write pole may affect the polarization of an adjacent cells (i.e., overwrite the adjacent cells). One technique for adapting the magnetic media to utilize smaller cells while preventing adjacent cells from being overwritten during a write operation is shingled magnetic recording (SMR).

Shingled magnetic recording utilizes a large strong write field generated by the write pole. One constraint of shingled magnetic recording is that when the data is written to the magnetic media, it is written in sequentially increasing or decreasing radius tracks. The strong write field overlaps a currently written track with a previously written track, leaving a relatively small strip of the previous write track unaffected, and also overlaps that currently written track with one or more not-yet-written tracks. The remaining strip of written data on the previously written track contains the aforementioned cells which, while merely a fraction of the feasible write size, are sufficiently large to be read using the read pole. As a result, while shingled magnetic recording still allows for traditional random access read operations, writes can no longer be done randomly because a single-track write modifies/overwrites the one or more not-yet-written (or yet-to-be written) tracks. As a result, in order to change any data cell within the shingled data, the entire shingled data is re-written in the selected sequential write order.

In order to achieve the increased cell density made possible by shingled magnetic recording while compensating for the lack of random write functionality in a magnetic disc implementation, one or more isolation regions may be allocated on the disc with shingled data. The isolation regions, also referred to as guard tracks, guard bands, etc., are areas within the shingled data unavailable for recording that define separate bands of shingled data including multiple data tracks. Typically, each isolation region is wide enough to prevent any overwriting across the isolation region. As a result, one band of shingled data is rewritten when one or more cells within the band are changed. More tightly spaced isolation regions create smaller bands between the guard tracks and thus the time to re-write a band decreases. However, as more isolation regions are used, the effective disc data storage density decreases because otherwise available space on the magnetic medium is occupied by the isolation regions. The presently disclosed technology allows determining the isolation regions for a storage device based on a data region spacing specified by a host device. The SMR technology is also used in other types of storage device such as memory cards, universal service bus (USB) flash drives, solid-state drives, etc.

Typically, in SMR systems, the storage area, such as a disk surface, is organized as data regions and isolation regions. In one implementation of SMR, the storage device selects the region boundaries and one or more rules are associated with data regions. One such a rule is, for example, that all writes within a data region are restricted to sequentially increasing addresses. An alternate rule is requiring a Trim command to be issued for all addresses that belong to a data region, before that data region is re-written. In such implementations, a host communicating with the storage device has the responsibility for following the rules and for the data integrity. To satisfy the data integrity, the host needs to know what the rules are and where the data region boundaries are located. In one implementation, the storage device specifies the region boundaries and other rules related to the data regions to a host communicating with the storage device. However, such specification of the data region boundaries may not be a solution that is suitable for the host device. For example, a host may prefer each data region of the storage device to have one GB of storage capacity. If such a host is connected to a storage device that has data regions of 0.9 GB, in such a case, the host may not be able to make full use of the storage device as it needs two 0.9 GB data regions to satisfy the 1 GB requirement thus using 1.8 GB of storage space for 1 GB of information. The implementations described herein provides a host device to specify data regions of a storage device such that the host is not restricted by the data region spacing and the rules related thereto as specified by the storage devices.

Figure 1:
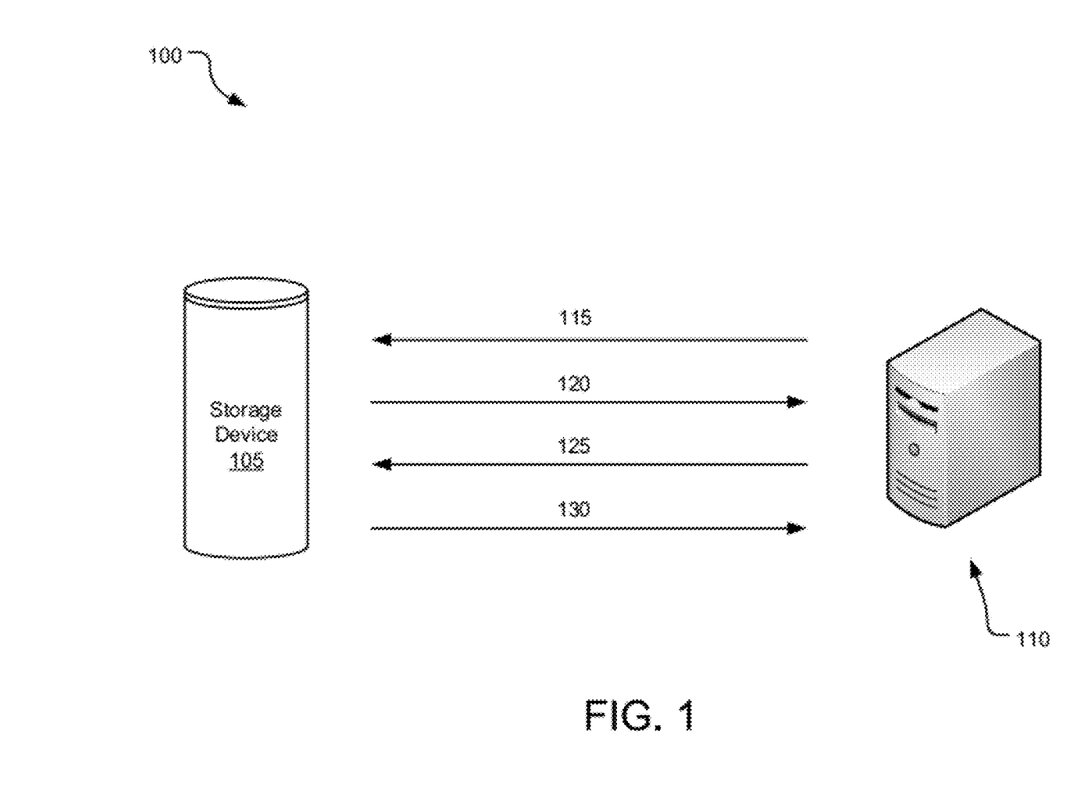
FIG. 1 illustrates an example block diagram of a storage device communicating with a host device.

FIG. 1 illustrates an example block diagram 100 of a storage device communicating with a host device. In one implementation, the storage device 105 is one of a disk drive, a memory card, a universal service bus (USB) flash drive, and a solid-state drive. The host device 110 is one of a computer, a server, a network switch, etc. The host device may include a volatile memory, a non-volatile memory, a non-transitory memory, a processor, one or more input and output terminals, one or more communication terminals, etc. In one implementation, the storage device 105 is provided with a storage controller or other device that includes a volatile memory, a non-volatile memory, a non-transitory memory, a processor, one or more input and output terminals, one or more communication terminals, etc. In one implementation, one or more computer process including a number of operations may be stored in the volatile or the non-volatile memory of the storage controller and the host 110 such that the operations may be processes using a processor.

In the implementation disclosed in FIG. 1, the storage device 105 is adapted to use shingled magnetic recording (SMR) technology for storing data. The host 110 may use the storage device 110 for short-term data storage where the data is to be frequently written to and read from the storage device 105. Alternatively, the host 110 may use the storage device 105 for long-term data storage, such as for archival of data. Depending on the type of data storage needs of the host 110, the host 110 would prefer different data region spacing and data region boundary definitions.

As represented by the numeral 115, the host 110 may initiate a storage session with the storage device 105 by sending a request for storage space. Specifically, the host 110 may request the storage device 105 about the amount of space that the storage device 105 has currently available for storage. In one implementation, the host 110 may request the storage device to identify the amount of contiguous storage space that is available on the storage device 105.

In response to the request 115 from the host 110, the storage device 105 responds by communicating the amount of space available for storage, as represented by numeral 120. In one implementation, the storage device 105 communicates information about more than one contiguous storage spaces available on the storage device 105. For example, if the storage device 105 includes a deck of disks and the amount of contiguous space on one or more of the deck of disks is different, the storage device 105 may communicate information about each block of contiguous spaces to the host 110. Alternatively, the storage device 105 may inform the host 110 about the largest size of the contiguous block of space available. In yet alternate implementation, the storage device 105 may also send information about one or more rules related to the storage space available. Thus, for example, in one implementation, the storage device communicates information about how much spacing is required for isolation between two separate blocks of data regions. Alternatively, the storage device 105 may also communicate information about one or more rules, such as requirement for Trim command issuance before re-writing a data region, etc., to the host 110.

In one example, the storage device 105 may communicate that the largest block of data region available is 10 GB. Alternatively, in one implementation, the storage device 105 may be an unused disk drive system with a total storage capacity of 50 GB, in which case the information about the total available capacity of 50 GB is communicated to the host 110. In such a case, the storage device 105 also communicates to the host 110 that if the total storage capacity of 50 GB is to be divided into more than one data regions, each data region is separated from the next data region by an isolation region of at least 0.1 GB, etc. In one implementation, the information about the isolation region is different for each of various data regions. Thus, for example, if a contiguous data region is located towards an outer diameter of a disk drive, the isolation region required between two or more data regions to be created from such contiguous data region may be larger. Alternatively, if a contiguous space region is located towards an inner diameter of a disk drive, the isolation region required between two or more data regions to be created from such contiguous data region may be smaller.

Subsequently, as represented by the numeral 125, the host 110 communicates information about the data regions it requires for a specific write operation. Thus, for example, the host 110 may communicate to the storage device 105 that is needs 5 GB of contiguous space. In one implementation, the host 110 may determine the size of data regions and the isolation regions based on its current requirements. For example, the host 110 may need storage space for archival purposes where once it writes data, it would not need to re-write or update the data for a long period of time and that it has sufficient data available for writing the entire contiguous data region that is currently available. In such a case, the host 110 notifies the storage device 105 that the entire contiguous data space is to be identified as one data region. In such a case, the host 110 also notifies the storage device 105 that it is not necessary to provide any isolation region because all the available storage space is to be written and re-written as one block.

In an alternate implementation, the host 110 may need five 5-GB data regions. In such a case, the host 110 notifies the storage device 105 to make data regions of 5 GB size and to provide isolation regions at end of each such data regions. In an alternate implementation, the host 110 may also notify the storage device 105 of the logical block addresses (LBAs) where a data region is to start and an LBA where a data region is going to end. Alternatively, the information about the LBA is determined by the storage device 105 and communicated to the host 110. Alternatively, the host 110 may determine an LBA where a data region is to start and an LBA where that data region is to end and use that information to conform to the access rules. In this case the host does not notify the storage device 105 of its data region boundary selection.

In response to the data region request 125, the storage device 105 sends a confirmation, as illustrated by numeral 130, to the host 110. The storage device 105 may send a confirmation to the host 110 that the data regions as requested are available. In one implementation, where the host 110 requests the data regions without specifying the LBAs of the data regions, the confirmation sent from the storage device 105 to the host 110 includes information about the LBAs of the data regions as well. In some circumstances where the storage device 105 is not able to provide the data regions and the isolation regions as requested by the host 110, the confirmation may include such information along with reasons for the data regions being not available. In such case, the host 110 may communicate back to the storage device 105 with an alternate request for data regions and isolation requests.

Figure 2:
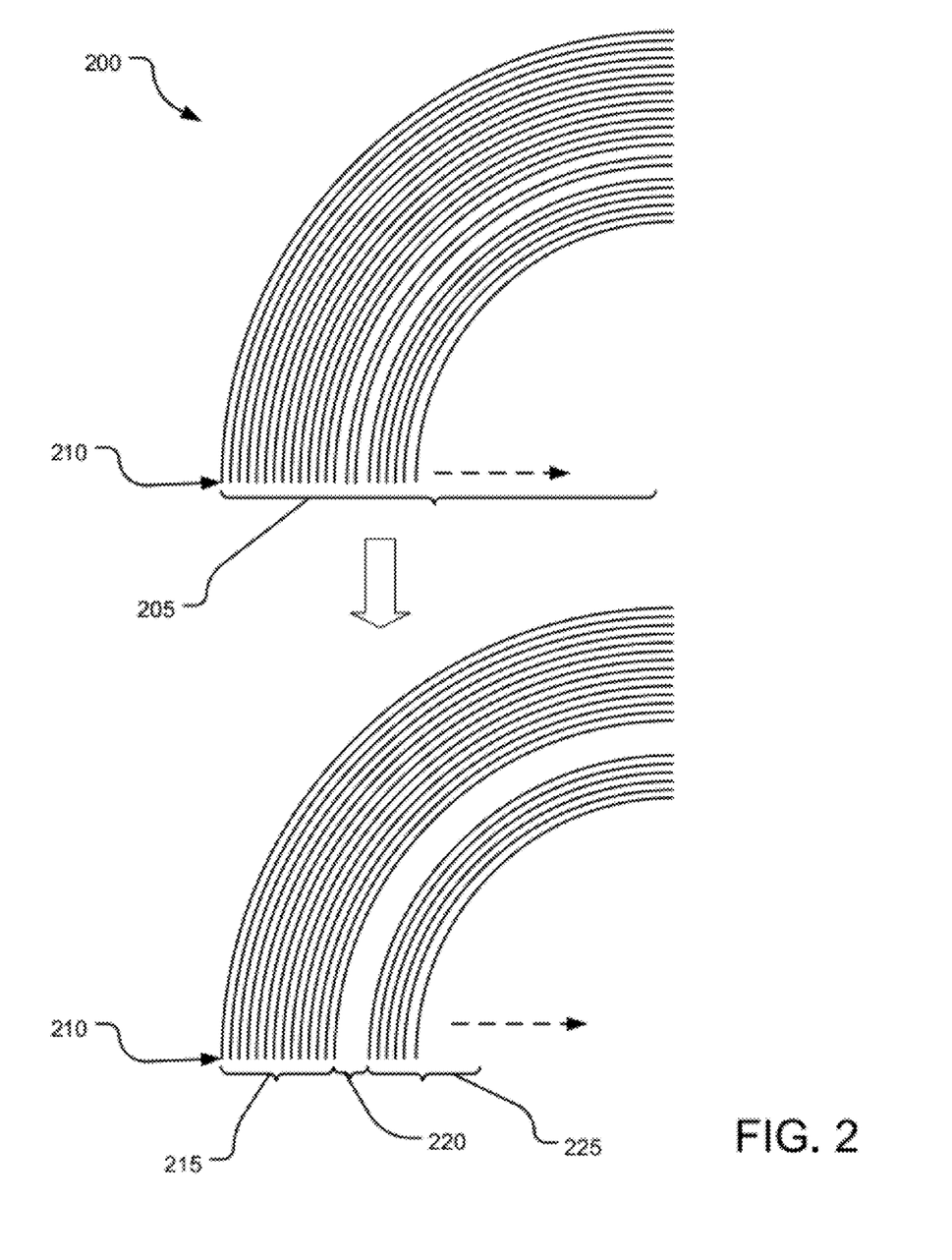
FIG. 2 illustrates an example section of a magnetic disk with storage region having data region and dynamic isolation regions.

FIG. 2 illustrates an example section of a disk drive 200 with data regions determined based on a region sizing specified by a host device. Specifically, FIG. 2 illustrates a diagram of a storage space 205 on the disk drive 200 that may be used by a host device, such as the host 110. In one implementation, the storage space 205 represents that currently available storage space on the disk drive 200. Note that for simplicity purpose only quarter of the tracks on a disk drive 200 are illustrated in FIG. 2. Moreover, the storage space 205 continues towards the inner diameter of the disk drive 200. In an alternate implementation, the storage space 205 may continue on to a next disk of a deck of disks that are included in the disk drive 200.

In response to a request from a host device, the disk drive 200 notifies the host device that the currently available largest contiguous block on disk drive 200 is that represented by the storage space 205, with a total storage capacity of 1000 GB. The disk drive 200 also notifies the host device that the starting LBA of the available storage space is 210. In one implementation, the host device requires data regions of 10 GB each. In such a case, the host device notifies the disk drive 200 that the storage space 205 is to be divided into a number of data regions, each of 10 GB size. In one implementation, a data region is defined as an area of sequential write. In other implementation, a data region may be defined as an area that, if a rewrite is required for any part of that region, the rewrite operation will have to begin at the beginning of that region. Alternate definitions of data regions may also be used.

In response to the request from the host device, the disk drive 200 may divide the storage space 205 into equal data regions of 10 GB each. Moreover, each data region is separated by an isolation region. Thus, in the implementation illustrated in FIG. 2, a first data region 215 beginning at the storage location 210 is created. The first data region 215 is separated by a second data region 225 by an isolation region 220. In the implementation illustrated in FIG. 2, a host device notifies the disk drive 200 about the size of the data regions and the disk drive 200 determines where the data regions 215, 225 are going to start and end. However, in an alternate implementation, the host device may notify the disk drive of the LBA where the data regions are to start and end. In this case the storage device reserves enough storage space between the data regions to supply a sufficient isolation region. Alternatively, the host device may instruct the storage device about the starting and ending LBAs of various isolation regions that are to be set aside by the disk drive 200. In this case the disk drive 200 may enforce the access rules for the regions. Alternatively, the host device may select the boundaries of the regions, conform to the rules for data regions and not access the isolation regions. In this case the host does not notify the disk drive 200 of its region boundary selections.

Figure 3:
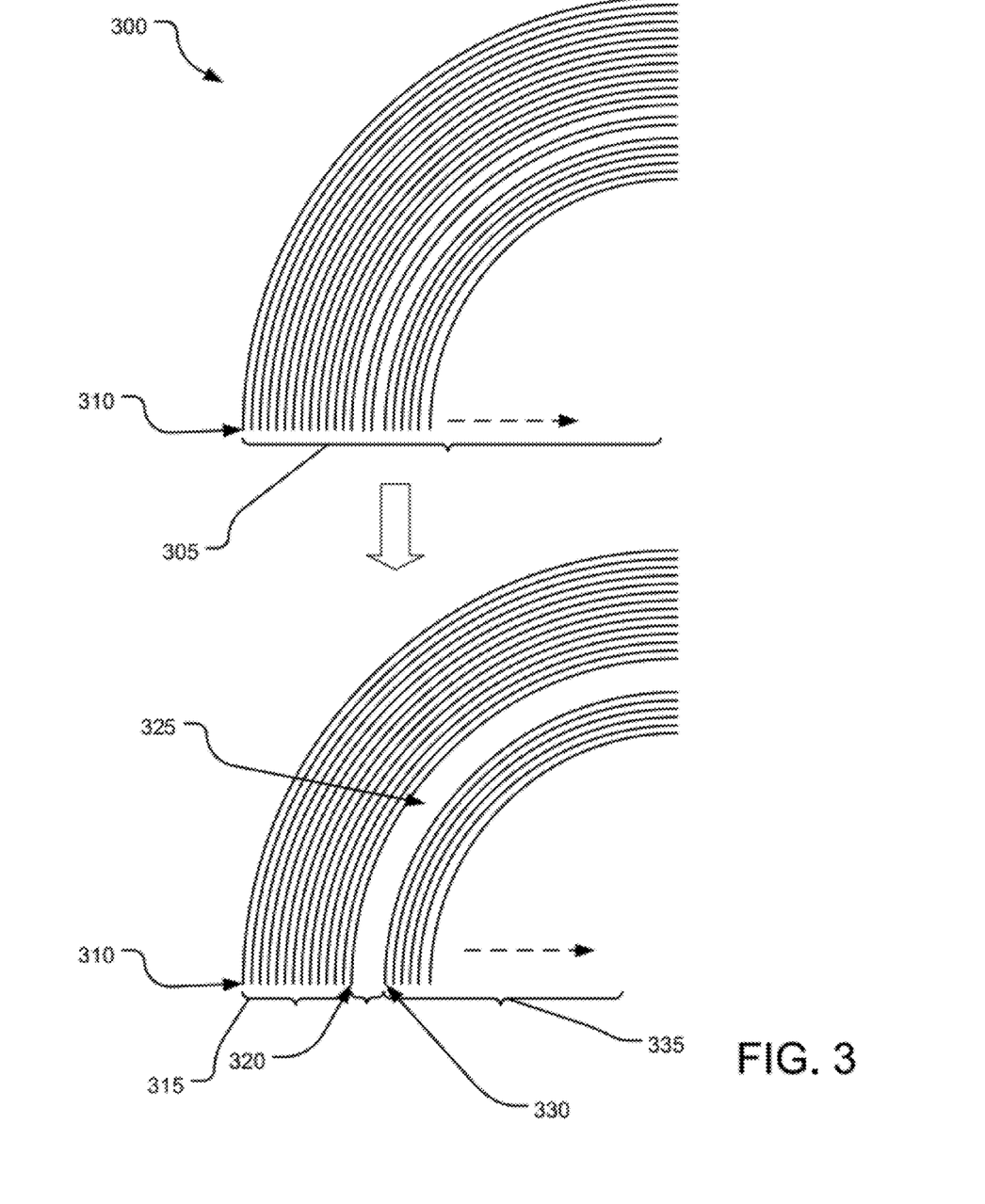
FIG. 3 illustrates an alternate example section of a magnetic disk with storage region having data region and dynamic isolation regions.

In an implementation, the host may determine that it needs various data regions, with two or more such regions being of different size. In such a case, the host device may merely communicate the starting and ending LBA of various data regions to the disk drive. FIG. 3 illustrates such an implementation wherein the disk drive has available storage space represented by 305 starting at LBA 310. In such an implementation, the host device may instruct the disk drive 300 that a first data region 315 is to begin at LBA 310 and to end at LBA 320. The first isolation region 325 is set to begin at storage location 320 and to end at storage location 330. The second data region, 335, which is of a size different from the first data region 315, begins at LBA 330. Even though in the implementation illustrated in FIG. 3, the isolation region 325 is set to begin at storage location 320 and to end at storage location 330 wherein both the LBA 320 and LBA 330 are illustrated to be at the same circumferential location on the disk drive 300, in an alternate implementation, the LBAs 320 and LBA 330 may be located at any other circumferential location on the disk drive 300.

While in the implementations described above, the isolation regions are assumed to consume LBAs, in an alternate implementation, the isolation regions do not consume LBAs. Thus, in such an alternate implementation, the LBA of data regions continues sequentially from one data region to the next data region. For example, if the ending LBA of a first data region is X, the starting LBA of a second data region that starts after the isolation region separating the first data region and the second data region will be X+1.

The data region specification illustrated in FIG. 3 gives a host device flexibility to specify various data regions such that the total storage space available on the disk drive 300 is utilized for the advantage of the host device. To achieve such flexible data regions, the disk drive 300 needs to notify the host device of the starting address of the total available storage space and a size of the isolations regions required between two consecutive data regions. Based on this information, the host device determines the LBA of the boundaries between data regions. In such an implementation, the disk drive 300 may not even have to be notified as to where the storage region boundaries are because the host device, knowing the requirement of the isolation region sizing, automatically provides write commands that would ensure that there is enough spacing between adjacent storage region spaces. In other words, in such an implementation, a host device is aware of how much addressable space is lost at each region boundary. In such case, from the disk drive 300's point of view, the amount of addressable space does not change.

Figure 4:
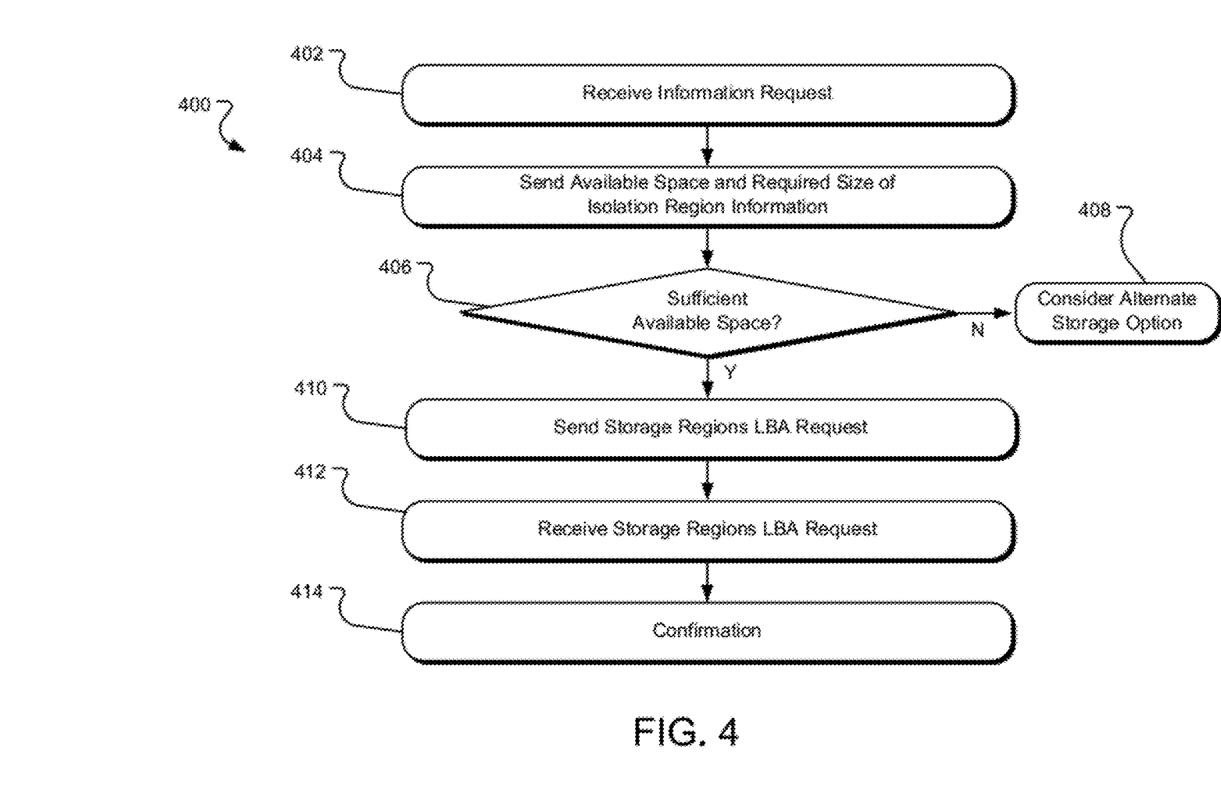
FIG. 4 illustrates example operations for determining a logical block address of an isolation region.

Now referring to FIG. 4, it illustrates example operations for determining locations of data regions and/or isolation regions for a storage device. Specifically, FIG. 4 illustrates a method of determining data regions for a storage device based on data region boundaries specified by a host device. A requesting operation 402 sends a request from a host device to a storage device about the available storage space on the storage device. In one implementation, the requesting operation also requests the storage device to identify if isolation regions are required, and if so, what is the minimum size of the isolation regions. In yet alternate implementation, a host device may not be required to send a request for the storage space information to the storage device. In such an implementation, a storage device may automatically provide such information to any host device connected to the storage device during system initialization.

In response to the requesting operation 402, a sending operation 404 sends information about the storage space available on the storage device to the host device. Moreover, in an alternate implementation, the sending operation 404 also sends information about required minimum size of isolation regions, other rules related to storage space, etc., to the host device. For example, the storage device communicates information about how much total space is available, what is the starting LBA of the available storage space. In one implementation, the storage device also communicates information about the size of isolation that is required between adjacent data regions in the storage space to maintain data integrity.

Based on the information received from the sending operation 404, a determining operation 406 determines if there is the profile of the available storage space on the storage device matches the needs of the host device. For example, the determining operation may determine whether the total storage space available is enough for the storage needs of the host device. In an alternate implementation, the determining operation determines if the ratio of isolation regions to the total storage space is such that it is efficient for the host device to use the storage space. For example, if the size of the isolation region required by a storage device between two data regions is too large and if the host device is looking for a large number of data regions, each region with comparatively small size, the determining operation may determine not to use the storage space from that particular storage device. In such a case, a considering operation evaluates alternate options for the host device's storage needs.

If the determining operation 406 determines that the storage device provides sufficient and suitable space, a sending operation 410 sends a request for LBA of data regions. In one implementation, the sending operation sends the request for LBA of data region to the storage device to create data regions. In one implementation, the sending operation 410 sends LBAs of the data regions from the host to the storage device. In an alternate implementation, the sending operation 410 sends the LBAs of the isolation regions to the storage device.

Consequently, a receiving operation 412 receives information about the data regions and/or the information about the isolation regions. In one implementation, the receiving operation receives the information about the requested data regions and/or information about the requested isolation regions from the host device. Note that in one implementation, it is not necessary that the storage device receive information about the LBAs of the data regions or the LBAs of the isolation regions. In such an implementation, the host device may plan one or more write operations with the requirements for isolation region size in consideration. In one implementation, a confirming operation 414 sends a confirmation that the requested data regions and the requested isolation regions are ready for use. The confirming operation 414 may send such confirmation to the host device requesting the data regions and/or the isolation regions. However, if the confirming operation sends a confirmation in the negative, the host device may send alternate request or it may consider alternate storage options.

Figure 5:
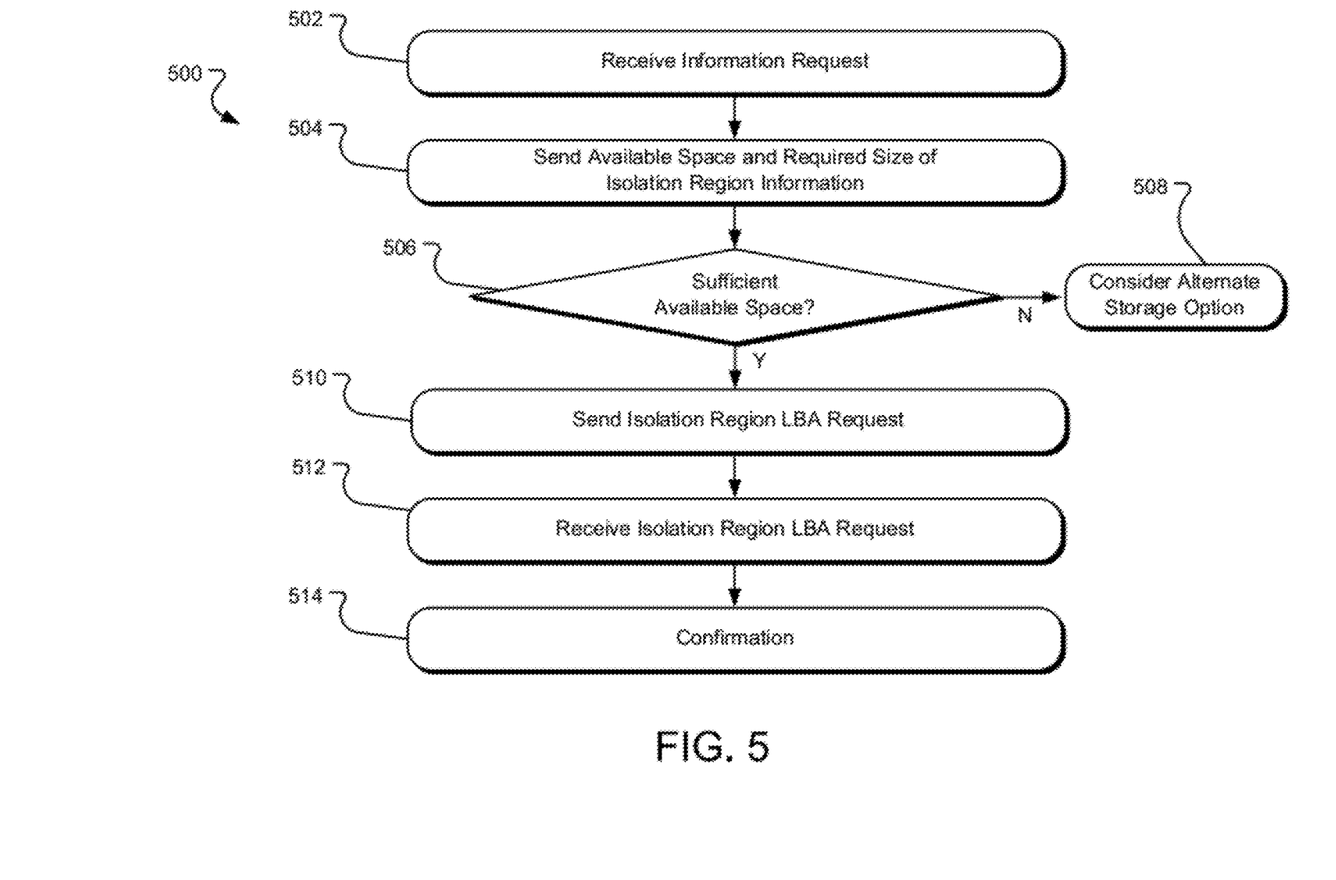
FIG. 5 illustrates alternate example operations for determining a logical block address of an isolation region.

FIG. 5 illustrates alternate example operations for determining a logical block address of isolation regions for a storage device. Note that one or more operations illustrated in FIG. 5 are similar to various operations illustrated in FIG. 4. Specifically, each of the requesting operation 502, sending operation 504, the determining operation 506, and the considering operation 508 operate in a manner similar to the requesting operation 402, sending operation 404, the determining operation 406, and the considering operation 408, respectively.

The sending operation 510 sends a request for where to start and end various isolation regions. Specifically, the sending operation may send LBA of the starting locations of one or more isolation regions and the LBAs of the ending locations of one or more isolation regions. In an implementation, the sending operation 510 may send the information about the LBAs of the isolation regions from a host device to the storage device. Subsequently, a receiving operation 512 may receive the LBAs of the starting locations of one or more isolation regions and the LBAs of the ending locations of one or more isolation regions. If the storage device determines that the specified LBAs for the starting and ending locations of the isolation regions is appropriate, a confirming operation 514 sends a confirmation. In one implementation, such a confirmation is sent from the storage device to the host device requesting the isolation regions.

The implementations described herein may be implemented as logical steps in one or more computer systems. The logical operations of the various implementations described herein are implemented (1) as a sequence of processor-implemented steps executing in one or more computer systems and (2) as interconnected machine or circuit modules within one or more computer systems. The implementation is a matter of choice, dependent on the performance requirements of the computer system. Accordingly, the logical operations making up the embodiments of the implementations described herein are referred to variously as operations, steps, objects, or modules. Furthermore, it should be understood that logical operations may be performed in any order, unless explicitly claimed otherwise or a specific order is inherently necessitated by the claim language.

In the interest of clarity, not all of the routine functions of the implementations described herein are shown and described. It will be appreciated that in the development of any such actual implementation, numerous implementation-specific decisions are made in order to achieve the developer's specific goals, such as compliance with application- and business-related constraints, and that those specific goals will vary from one implementation to another and from one developer to another.

The above specification, examples, and data provide a complete description of the structure and use of example implementations. Because many alternate implementations can be made without departing from the spirit and scope of the invention, the invention resides in the claims hereinafter appended. Furthermore, structural features of the different implementations may be combined in yet another implementation without departing from the recited claims.

What is claimed is:

1. A method comprising:
   receiving, from a host device, a size of a data region that is bounded by an isolation region; and
   determining a storage location of the isolation region based on the size of the data region.

2. The method of claim 1, wherein the isolation region comprises a set of storage locations required for isolation of one or more data regions of a storage device.

3. The method of claim 1, wherein the size of the data region is a sequential write area needed by the host device.

4. The method of claim 1, wherein the size of the data region is a span of addresses which, when isolated, do not interact with other data regions.

5. The method of claim 1, wherein the isolation region allows writing to one of the data regions adjacent to the isolation region without adversely affecting data in other of the data region adjacent to the isolation region.

6. The method of claim 1, further comprising:
   determining the logical block address of the isolation region based on an end of the data region specified by the host device.

7. The method of claim 1, further comprising: communicating a minimum isolation region size from a storage device to the host device, wherein the minimum isolation region size represents the minimum space required for two data regions to be isolated on the storage device.

8. The method of claim 7, wherein the minimum isolation region size represents the number of neighboring tracks on the storage device that get affected by a write operation and the minimum size of that number of neighboring tracks.

9. The method of claim 7, wherein the minimum isolation region size represents minimum isolation region size for at least one of (1) a disk drive; (2) a specified region of the disk drive; and (3) a specified location of the disk drive.

10. The method of claim 1, wherein a storage device uses shingled magnetic recording for recording data.

11. The method of claim 1, wherein a storage device is a disk drive.

12. The method of claim 1, wherein the host device specifies the size of the data region by specifying a starting LBA and an ending LBA of the data region.

13. One or more non-transitory computer-readable storage media encoding computer-executable instructions for executing on a computer system a computer process comprising:
   receiving, from a host device, a size of a data region that is bounded by an isolation region; and
   determining a storage location of the isolation region based on the size of the data region.

14. The computer-readable storage media of claim 13, wherein the size of the data region is a sequential write area needed by the host device.

15. The computer-readable storage media of claim 13, further comprising:
   communicating a minimum isolation region size from a storage device to the host device, wherein the minimum isolation region size represents the minimum space required for two data regions to be isolated on the storage device.

16. The computer-readable storage media of claim 15, wherein the minimum isolation region size represents the number of neighboring tracks on the storage device that get affected by a write operation and the minimum size of that number of neighboring tracks.

17. The computer-readable storage media of claim 15, wherein storage device uses shingled magnetic recording for recording data.

18. A system for managing storage space regions on a storage media, the system comprising:
   a storage controller module, wherein the storage controller module is adapted to:
   communicate information about storage space available on the storage media to a host device;
   communicate information about size of one or more isolation regions required for the storage media to the host device; and
   receive instructions about a storage location of an isolation region from the host device.

19. The system of claim 18, wherein the storage controller is further adapted to communicate a minimum isolation region size from the storage device to the host device, wherein the minimum isolation region size represents the minimum space required for two data regions to be isolated on the storage device.

20. The system of claim 18, wherein the storage media uses shingled magnetic recording for recording data.

* * * * *